United States Patent [19]
Parfitt et al.

[11] 3,833,271
[45] Sept. 3, 1974

[54] VEHICLE BRAKING SYSTEMS

[75] Inventors: Maurice Parfitt; Keith William Langley, both of London, England

[73] Assignee: Westinghouse Brake and Signal Company, London, England

[22] Filed: June 13, 1973

[21] Appl. No.: 369,519

[30] Foreign Application Priority Data
July 4, 1972 Great Britain .................. 32179/72

[52] U.S. Cl. .......................... 303/21 A, 303/22 R
[51] Int. Cl. ............................................. B60t 8/04
[58] Field of Search ...... 188/195; 303/21 A, 21 BE, 303/21 F, 22 R

[56] References Cited
UNITED STATES PATENTS
3,443,842  5/1969  Pier............................. 303/21 A X
3,527,504  9/1970  Chovings et al. ................. 303/21 A
3,707,313  12/1972  Michellone et al. ............. 303/21 A

*Primary Examiner*—Duane A. Reger
*Attorney, Agent, or Firm*—Larson, Taylor and Hinds

[57] ABSTRACT

A vehicle braking system is proposed in which the fluid pressure for braking is derived from a controlled magnet valve arrangement and in this advantageous system the supply of fluid pressure to the magnet valve arrangement is provided by a variable load valve which is arranged by being provided with a pressure responsive member which is extra to the pressure responsive member for making the output thereof vehicle load responsive. The extra pressure responsive member is thus supplied with pressure from an E.P. converter responsive to an electrical vehicle speed signal so as to oppose vehicle load pressure signals and thus make the supply of fluid pressure to the magnet valve arrangement speed and load dependent down to a given value of the electrical speed signal.

7 Claims, 1 Drawing Figure

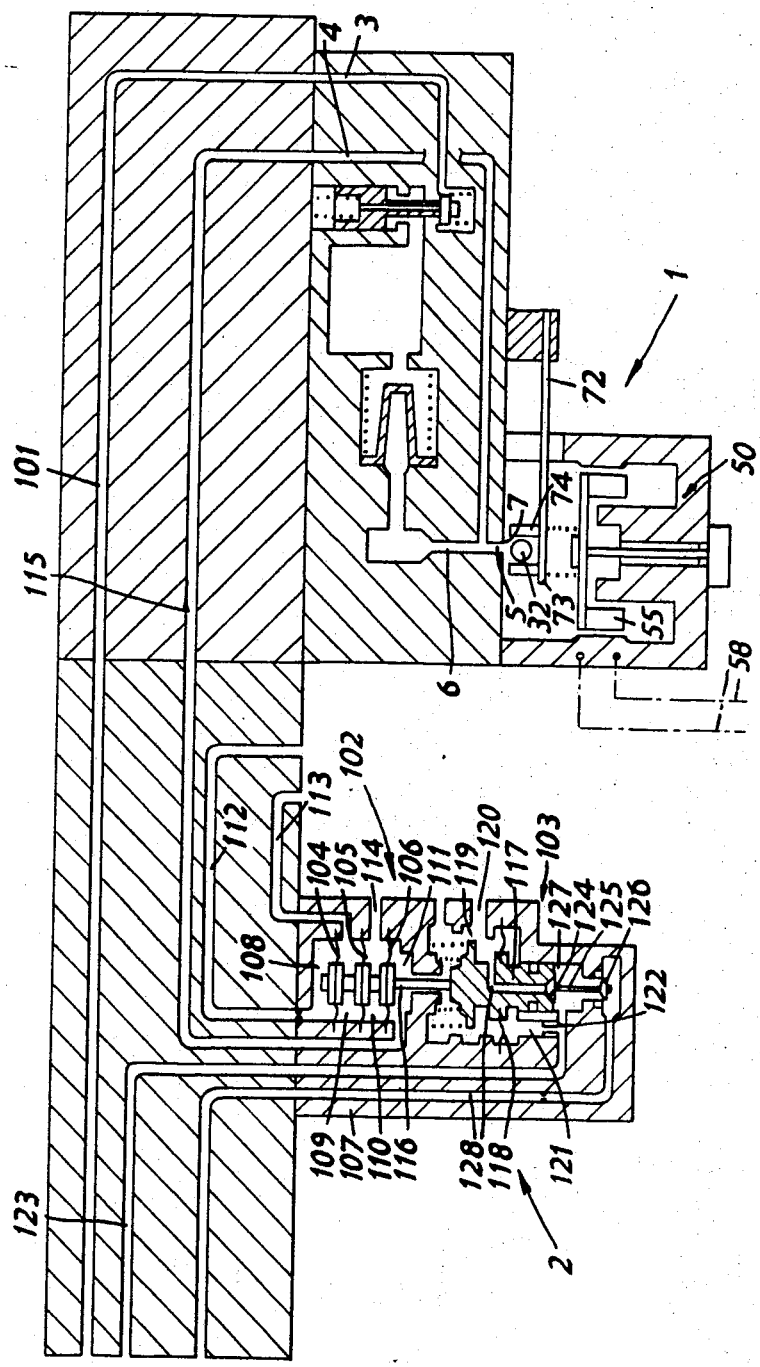

VEHICLE BRAKING SYSTEMS

This invention relates to vehicle braking systems and more particularly, although not exclusively, to railway-vehicle braking systems.

The present invention provides a vehicle braking system incorporating a converter by which an electrical input signal the value of which is indicative of the speed of the vehicle is converted into a fluid-pressure output the value of which is dependant upon the value of the input signal; and a self-lapping fluid-pressure control valve assembly having a control portion and a valve portion controlled by the control portion to provide a fluid-pressure output the value of which is determined by the control portion; the control portion having a first pressure-responsive member to which is applicable a fluid pressure indicative of the loading of the vehicle to generate a first force, a second pressure-responsive member to which is applicable the output of the converter to generate a second force in opposition to the first force, and a third pressure-responsive member to which is applicable the output of the valve portion to generate a third force which together with the first and second forces provides a balance of forces in the control portion only when the value of the output of the valve portion is that which is indicative of both the speed and the load of the vehicle.

The converter may conveniently be of the type described and claimed in our co-pending Pat. application No. 224057.

The first fluid pressure may be indicative of the load of the vehicle at one end only thereof, the control portion then having a further pressure-responsive member to which is applicable a further fluid pressure which is indicative of the load of the vehicle at the opposite end to generate a fourth force acting in the same direction as the first force so that the greater of the first and fourth forces has to be balanced by the second and third forces to determine the value of the output of the valve portion.

One embodiment of the present invention will now be described in greater detail, by way of example only, with reference to the accompanying drawing which is a diagrammatic cross-sectional view of that part of a vehicle braking system which incorporates the present invention.

The part of the braking system shown in the accompanying drawing is for incorporation in a railway braking system of the type which is, of its self, well-known. A typical such system is the so-called "Westcode" (Registered Trade Mark) braking equipment described, for example, in Appendix 8 of "An Introduction to Railway Braking" by H. R. Broadbent and in more detail in the Paper entitled "Combined Air Dynamic Braking Systems for Railway Vehicles, Particularly the New Lightweight Cars for the Toronto Transit Commission" by Dr. I. G. Moore presented before The Institution of Locomotive Engineers on the 16th Dec. 1963 and published in that Institution's Journal as Paper No. 651. Specifically, the part of the braking system shown in the accompanying drawing is designed for replacement of the so-called Variable Load Valve of the "Westcode" braking equipment; the part shown in the accompanying drawing, inter alia, providing for the functions of the replaced Valve.

In view of the disclosure in these documents of this now well-known type of braking equipment, only a very general description of this equipment is required in this Specification.

So far as the present invention is concerned, the "Westcode" equipment includes an electro-pneumatic system which is controlled by the selective energisation in various combinations of wires which pass the length of the train and which, on each vehicle of the train, energise the selected combination of electro-magnetic valves the outputs of which are applied to a plurality of various-sized diaphragms to operate a self-lapping valve to produce therefrom a pneumatic pressure output which is applied to the brake cylinder of the vehicle to effect through the electro-pneumatic braking system a degree of braking determined by the combination of energisation of the wires. In the electro-pneumatic system, there is incorporated the Variable Load Valve by means of which the input pressures to the electro-magnet valves are varied in accordance with the loading of the vehicle so that the pressure applied to the brake cylinder is determined not only by the combination of the energised wires but also by the load of the vehicle.

A desirable feature which in some circumstances of application of the "Westcode" equipment is required to be provided for is that which is known as "Speed Taper." This feature is to ensure that no over-braking occurs particularly for high speeds of the vehicle. The higher is the speed potential of the vehicle the more desirable it is that provision should be made for limiting the degree of braking which can be effected at the higher speeds of the vehicle. It is, therefore, desirable that the system should provide means whereby the degree of braking actually effected is reduced from that which is called-for by the energisation of the train wires if the speed of the vehicle is above some predetermined value and, above that value, is proportionately reduced with the higher speeds of the vehicle.

The replacement for the Variable Load Valve of the "Westcode" equipment seeks to provide this facility.

Referring now to the accompanying drawing, the parts which replace that Variable Load Valve are therein shown and comprise a pair of units 1 and 2.

The unit 1 is an electro-pneumatic converter of a construction substantially identical to that shown for the valve means described and claimed in the above mentioned co-pending Pat. application No. 224057 and like references are used for like parts in the following description. The converter 1 has a fluid-pressure input port 3, a fluid-pressure output port 4 and an exhaust port 5 constituting one end of a bore 6 and encircled by a valve seat 7 variably closable by a ball 32. The ball 32 is loosely-located in a cup-shaped button 74 carried on the free end 73 of a cantilever-mounted leafspring 72. The upwardly directed (as shown in the accompanying drawing) forces acting on the ball 32 are determined by the interaction of current flowing in a coil 55 with the magnetic field generated by a permanent magnet 50. An electric-current signal can be fed to the coil 55 over leads 58.

An electric-current signal is only applied to the leads 58 in the event of the speed of the vehicle being above a predetermined value but, above that value, the value of the signal is related to the speed of the vehicle. Hence, the value of the signal is indicative of the speed of the vehicle either by its absence (thereby to indicate that the speed of the vehicle is below the predetermined value) or, in the presence of the signal, by the value of the current being related to the speed of the vehicle.

From the description of the operation of the converter in our above mentioned co-pending Pat. appln. No. 224057 it will be seen that if a fluid-pressure is applied to the port 3 over the conduit 101 an output fluid-pressure will appear at port 4 which, being related to the value of the electric-current signal applied to the leads 58, will also be indicative of the speed of the vehicle.

The unit 2 is a self-lapping fluid-pressure control valve assembly similar in general construction to the Variable Load Valve of the "Westcode" equipment and comprises a control portion 102 and a valve portion 103.

The control portion 102 has three pressure-responsive members 104, 105 and 106 each in the form of a diaphragm. The diaphragms 104, 105 and 106 provide between each other and between the body 107, chambers 108, 109, 110 and 111. Communicating with the chamber 108 is a conduit 112 over which can be applied a pneumatic pressure indicative of the load of the vehicle at one end thereof. Similarly, communicating with chamber 109 is a conduit 113 over which can be applied to the chamber 109 a pneumatic pressure indicative of the load of the vehicle at the opposite end thereof. The chamber 110 is opened to atmosphere via port 114 and the chamber 111 is connected via a conduit 115 to the output port 4 of the converter 1 so that there can be applied to the chamber 111 the output pressure of the converter.

While the diaphragm 104 is freely movable axially with respect to the other two diaphragms 105 and 106, these latter diaphragms 105 and 106, these latter diaphragms are connected by a stem 116 to a valve element 117. The valve element 117 is carried by a diaphragm 118 which serves to provide two chambers 119 (which is open to atmosphere via port 120) and 121 which via choke 122 communicates with a conduit 123. The valve element 117 provides a valve seat 124 engageable (and as shown in the accompanying drawing, actually engaged) with the upper end of a double-headed valve closure element 125 the lower head of which is engageable with a valve seat 126 provided in the valve body 107. The upper head of the valve closure member 125 serves, in the position thereof in which it is seated against the valve seat 124, to sever connection between a chamber 127 (with which communicates the conduit 123) and a bore 128 in the valve element 117 which at its end remote from the valve closure member 125 opens into the chamber 119. The lower head of the valve closure member 125 serves (when seated against the valve seat 126) to sever communication between the chamber 127 and a conduit 128.

When the units shown in the accompanying drawing are incorporated in a "Westcode" equipment, the conduit 101 is connected to be supplied with pneumatic pressure from the main reservoir; the conduit 123 is connected to the inlet ports of the E.P. Brake Magnet Valves and the conduit 128 is connected as for the corresponding conduit of the Variable Load Valve, to the main reservoir.

In so far as the function of the unit 2 is that of a variable load valve, its functions in precisely the same manner as the Variable Load Valve of the "Westcode" equipment save that in the unit 2 provision is made for measuring the load at each end of the vehicle and for the higher of these two measured loads to be the effective controlling one. It will be seen that this will be so from condideration of the accompanying drawing where, because of the independence of the diaphragm 104 from the diaphragm 105 and 106 and the supply to chambers 108 and 109 of pneumatic pressures indicative of the loading of the vehicle at the respective ends thereof, the greater of the forces generated on the stem 116 by the pressures in the chambers 108 and 109 will have have to be balanced by the force generated on the diaphragm 118 by the fluid pressure in the chamber 121 to obtain self-lapping of the unit 2. Thus, the output of the unit 2 applied over the conduit 123 and fed via the choke 122 onto the diaphragm 118 to achieve balancing of the forces within the unit 2, will be determined by the load of the more heavily loaded end of the vehicle.

Superimposed on the control forces generated by the load of the vehicle, is the force generated by the pneumatic output pressure (if any) from the converter 1. If the speed of the vehicle is below the predetermined value, then there will be no output pressure at the port 4 and, consequently, no pneumatic pressure in the chamber 111. In this condition, the unit 2 will function as a straight-forward variable load valve in the manner above described. However, if the speed of the vehicle is above that predetermined value then a corresponding pneumatic pressure will appear at the output 4 and will be applied via the conduit 115 to the chamber 111. In this event, the downwardly-directed forces generated on the stem 116 will be opposed by the upwardly directed force generated by the pneumatic pressure in the chamber 111. This opposition to the downwardly directed forces will reduce the resultant downwardly directed force by the amount of the upwardly directed force so that the output pressure from the unit 1 applied over the conduit 123 will correspondingly be reduced. Hence, it will be seen that the input pressure supplied to the E.P. Brake Magnet Valves will correspondingly be reduced so that the degree of braking effected by the equipment will be reduced with respect to that which is being called for by the selective energisation of the Magnet Valves.

If, when the braking is initiated, the speed of the vehicle is above the predetermined value, the effective degree of braking will be reduced in the manner above described but as the speed falls away under the effect of the braking so there will be a corresponding falling off of the pneumatic pressure output of the converter with a consequential reduction in the upwardly directed forces applied on the stem 116 on the unit 2. Thus, as the speed falls away, the degree of braking effected by the equipment will increase with the falling off of the speed until, when the speed has reached the predetermined value (and, therefore, the output of the converter applied over the conduit 115 reduces to atmospheric pressure) the degree of braking effected will only vary from that which is called-for by the selective energisation of the magnet valves by the load of the heavier end of the vehicle. That is to say, the unit 2 will, once again, operate merely as a variable load valve.

Having thus described our invention what we claim is:

1. A vehicle braking system incorporating a converter by which an electical input signal the value of which is indicative of the speed of the vehicle is converted into a fluid-pressure output the value of which is dependent upon the value of the input signal; and a self-lapping fluid-pressure control valve assembly having a control portion and a valve portion controlled by the control portion to provide a fluid-pressure output the value of which is determined by the control portion; the control portion having a first pressure-responsive member to which is applicable a fluid pressure indicative of the loading of the vehicle to generate a first force, a second pressure-responsive member to which is applicable the output of the converter to generate a second force in opposition to the first force, and a third pressure-responsive member to which is applicable the output of the valve portion to generate a third force which together with the first and second forces provides a balance of forces in the control portion when the value of the output pressure of the valve portion is determined by the speed and the load of the vehicle.

2. A vehicle braking system as claimed in claim 1 wherein the converter comprises valve means having first means a part of which is movable throughout a range of operational movement, said part being movable upon variation of an applied signal; damping means effective in operation of the valve means to damp vibrational movement of said part to a relatively small proportion of the range of operational movement of said part; resilient means to which is applicable motion of said part and which is effective to translate said motion into an output force the value of which varies with such motion; and valve closure means movable throughout a range of operational movement thereof relative to a valve seat variably to throttle escape of fluid from the valve seat and to which the resilient means applies said output force to act against the force exerted on the member in opposition thereto by the pressure of the escaping fluid, the range of operational movement of the valve closure member deing relatively small as compared to the range of operational movement of said port.

3. A vehicle braking system as claimed in claim 1 wherein the first fluid pressure is indicative of the load of the vehicle at one end only thereof, the control portion then having a further pressure-responsive member to which is applicable a further fluid pressure which is indicative of the load of the vehicle at the opposite end to generate a fourth force acting in the same direction as the first force so that the greater of the first and fourth forces has to be balanced by the second and third forces to determine the value of the output of the valve portion.

4. A vehicle braking system as claimed in claim 1, wherein the electrical input signal is indicative of the speed of the vehicle over a range of speeds above a predetermined value.

5. A vehicle braking system as claimed in claim 2, wherein the first fluid pressure is indicative of the load of the vehicle at one end only thereof, the control portion then having a further pressure-responsive member to which is applicable a further fluid pressure which is indicative of the load of the vehicle at the opposite end to generate a fourth force acting in the same direction as the first force so that the greater of the first and fourth forces has to be balanced by the second and third forces to determine the value of the output of the valve portion.

6. A vehicle braking system as claimed in claim 2 wherein the electrical input signal is indicative of the speed of the vehicle over a range of speed above a predetermined value.

7. A vehicle braking system as claimed in claim 3 wherein the electrical input signal is indicative of the speed of the vehicle over a range of speeds above a predetermined value.

* * * * *